(No Model.)
W. H. BRAY.
PACKING FOR GLASS GAGE TUBES.
No. 341,444. Patented May 11, 1886.
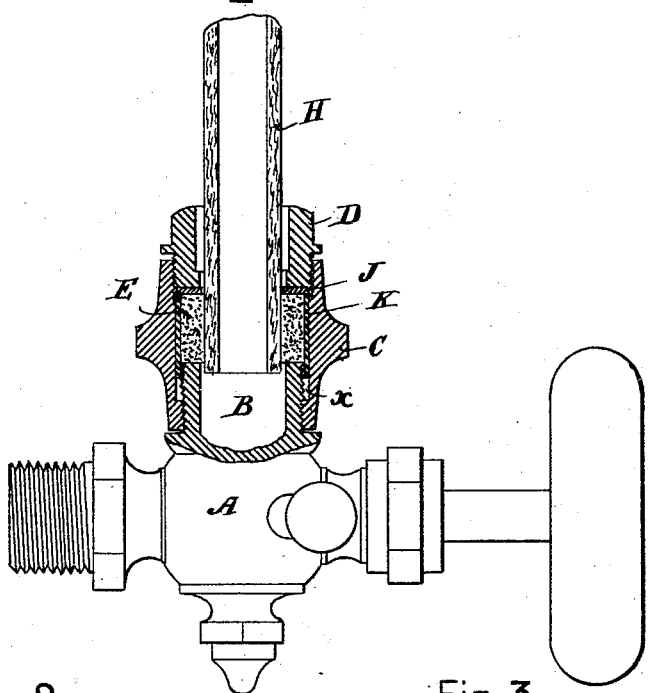
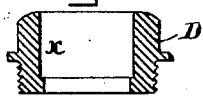
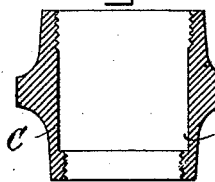
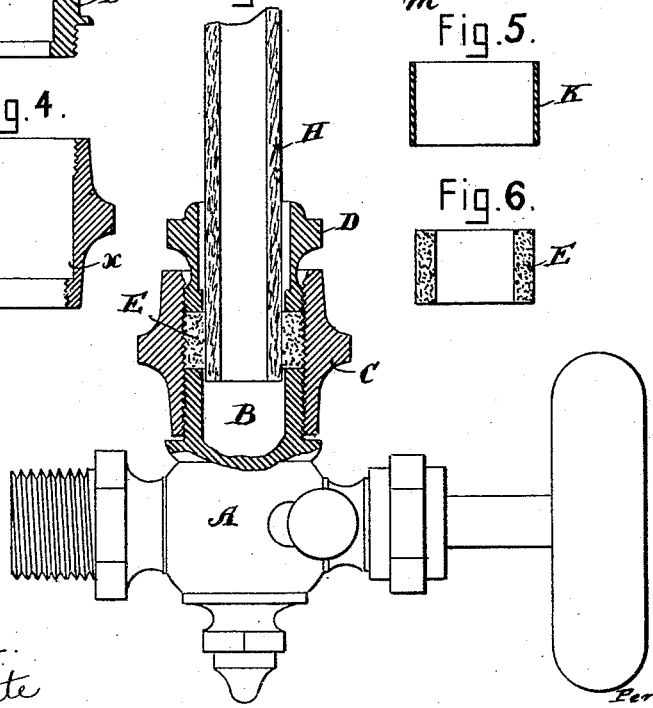
Witnesses.
E. Blantra.
L. J. White
Inventor.
William H. Bray
C. A. Shaw
Per
Attorney.

United States Patent Office.

WILLIAM H. BRAY, OF BOSTON, MASSACHUSETTS, ASSIGNOR TO HIMSELF AND DANIEL H. HOWES, OF SAME PLACE.

PACKING FOR GLASS GAGE-TUBES.

SPECIFICATION forming part of Letters Patent No. 341,444, dated May 11, 1886.

Application filed December 9, 1885. Serial No. 185,204. (No model.)

*To all whom it may concern:*

Be it known that I, WILLIAM H. BRAY, of Boston, in the county of Suffolk, State of Massachusetts, have invented a certain new and useful Improvement in Devices for Packing Glass Gage-Tubes, of which the following is a description sufficiently full, clear, and exact to enable any person skilled in the art or science to which said invention appertains to make and use the same, reference being had to the accompanying drawings, forming part of this specification, in which—

Figure 1 is a diagram showing my improved packing device; Fig. 2, a vertical section of the plug detached; Fig. 3, a like view of the follower detached; Fig. 4, a vertical section of the coupling detached; Fig. 5, a vertical section of the sleeve detached; Fig. 6, a vertical section of the rubber packing-ring detached, and Fig. 7 a diagram showing an ordinary device for packing glass gage-tubes.

Like letters of reference indicate corresponding parts in the different figures of the drawings.

My invention relates more especially to means for packing glass gage-tubes of steam-boilers; and it consists in a novel construction and arrangement of the parts, as hereinafter more fully set forth and claimed, by which a more effective and desirable device of this character is produced than is now in ordinary use.

In Fig. 7 of the drawings, A represents the cock; B, the nipple; C, the coupling; D, the plug; E, the rubber packing-ring, and H the tube. It will be observed that the coupling is threaded interiorly its entire length, and that the packing-ring rests on the top of the nipple, and the plug on the top of the packing-ring, so that when the plug is turned in to pack the tube the packing-ring will be compressed and forced outwardly against the tube, and also into the threads of the coupling. This method of packing the tube has, however, been found to be objectionable, for the reason that the heat hardens or vulcanizes the rubber into the threads of the coupling, so that when it becomes necessary to tighten up the packing it cannot be forced downwardly by the plug. It also renders it difficult to detach the coupling from the packing-ring or the ring from the tube after it has hardened, as described. My invention is designed to obviate this difficulty, and to that end I make use of means which will be readily understood by all conversant with such matters from the following explanation.

In Fig. 1 of the drawings, A represents the cock; B, the nipple; C, the coupling; D, the plug; E, the rubber packing-ring; H, the glass tube; J, the follower, and K the sleeve, the detachable parts, excepting the tube, being also respectively shown in section in Figs. 2, 3, 4, 5, and 6. The body of the coupling is turned out or enlarged to form the annular chamber *x* between the nipple and coupling, and fitted to work or slide vertically in said chamber there is a sleeve, K. The packing-ring E is placed around the tube H, and rests on the top of the nipple B, and disposed on the packing-ring and sleeve K there is an annular follower or disk, J, provided with a hole, *m*, for the tube H. The plug D, when screwed into the coupling, presses on the follower, and forces the packing-ring down onto the nipple and outwardly against the tube H and sleeve K, thereby packing the tube, in a manner which will be readily obvious without a more explicit description. As the plug is turned in to compress the ring E and pack the tube, as described, the sleeve K will be forced downwardly in the chamber *x*, said sleeve preventing the ring from coming in contact with the coupling. The follower being of the same diameter of the sleeve, and the sleeve fitted to work loosely in the coupling, it will be obvious that when the coupling is removed from the nipple and the plug unscrewed from the coupling the sleeve, packing ring, follower, and tube may be readily removed from the coupling.

Having thus explained my invention, what I claim is—

1. In a device for packing glass gage-tubes, the coupling C, sleeve K, follower J, packing-ring E, and plug D, combined and arranged to operate substantially as described.

2. In a device for packing glass gage-tubes, the combination of the tube H, nipple B, coupling C, plug D, sleeve K, follower J, and packing-ring E, constructed and arranged to operate substantially as set forth.

3. In a device for packing glass gage-tubes, a coupling provided with an interior screw-thread at either end, the interior of the coupling between the threaded portions being blank or unthreaded, in combination with a nipple, a plug, a sleeve, and a gage-tube, substantially as described.

WILLIAM H. BRAY.

Witnesses:
C. A. SHAW,
L. J. WHITE.